United States Patent [19]

O'Meara et al.

[11] Patent Number: 4,715,689
[45] Date of Patent: Dec. 29, 1987

[54] APPARATUS AND METHOD FOR SPATIAL INTENSITY THRESHOLD DETECTION

[75] Inventors: Thomas R. O'Meara, Malibu; Richard C. Lind, Woodland Hills, both of Calif.

[73] Assignee: Hughes Aircraft Company, Los Angeles, Calif.

[21] Appl. No.: 864,937

[22] Filed: May 20, 1986

[51] Int. Cl.[4] .......................... G02B 5/23; G02F 1/01
[52] U.S. Cl. .................................. 350/354; 350/353; 372/21; 372/99; 332/7.51
[58] Field of Search .................... 350/354, 353, 393; 372/21, 99, 9, 19; 332/7.51

[56] References Cited

U.S. PATENT DOCUMENTS 3,824,002  7/1974  Beard .

OTHER PUBLICATIONS

C. R. Giuliano et al, "Can Phase Conjugate Resonators Enhance Laser Performance?", Laser Focus, Feb. 1983, pp. 55-64.
A. E. Siegman et al, "Optical Resonators Using Phase Conjugate Mirrors", Optical Phase Conjugation, R. A. Fisher Ed., (Academic Press, N. Y. 1983).
H. Rajbenbach et al, Optics Letters, "Self-Induced Coherent Oscillations with Photorefractive $Bi_{12}SiO_{20}$ Amplifier", vol. 10, No. 3, Mar. 1985, pp. 137-139.
J. P. Huignard et al, "Wave Mixing in Photorefractive Bismuth Silicon Oxide Crystals and Its Applications", Optical Engineering, vol. 24, No. 4, Jul./Aug. 1985, pp. 586-592.
A. Hardy, "Sensitivity of Phase-Conjugate Resonators to Intracavity Phase Perturbations", IEEE Journal of Quan. Electronics, vol. QE-17, No. 8, Aug. 1981, pp. 1581-1585.
P. A. Belanger, "Phase Conjugation and Optical Resonators", Optical Engineering, Mar./Apr. 1982, vol. 21, No. 2, pp. 266-270.
J. Auyeung, "A Theoretical and Experimental Investigation of the Modes of Optical Resonators with Phase-Conjugate Mirrors", IEEE Journal of Quantum Electronics, vol. QE-15, No. 10, Oct. 1979, pp. 1180 through 1188.

Primary Examiner—Eugene R. LaRoche
Assistant Examiner—Michael B. Shingleton
Attorney, Agent, or Firm—V. D. Duraiswamy; V. G. Laslo; A. W. Karambelas

[57] ABSTRACT

A phase conjugate resonator (PCR) employing at least one phase conjugate mirror (PCM) provides high resolution spatial detection of individual locations in a two-dimensional optical array which exceed or fall below a threshold level. In one embodiment the optical intensity profile under investigation is imposed either onto one or both of the pump beams of a degenerate four-wave mixing PCM. In another embodiment a pair of PCMs are used as the two mirrors forming the PCR, with the pump beams for one PCM modulated and the pump beams for the other PCM serving as a threshold reference. In either case, the spatially modulated optical output may be read out with multiple detectors or an imaging system, or the cumulative area output of the PCR can be read out with a single detector to characterize the intensity profile relative to the threshold.

25 Claims, 5 Drawing Figures

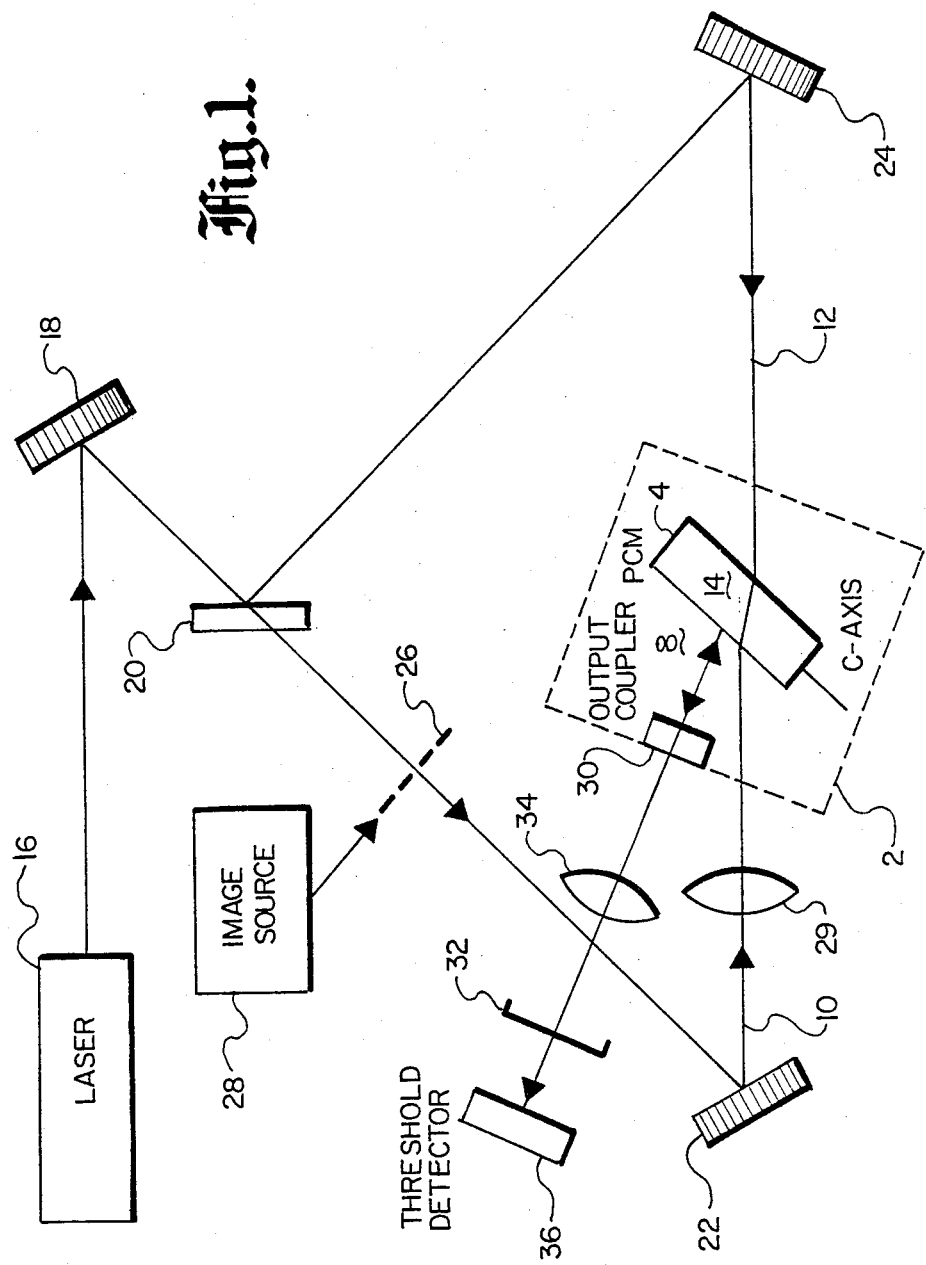

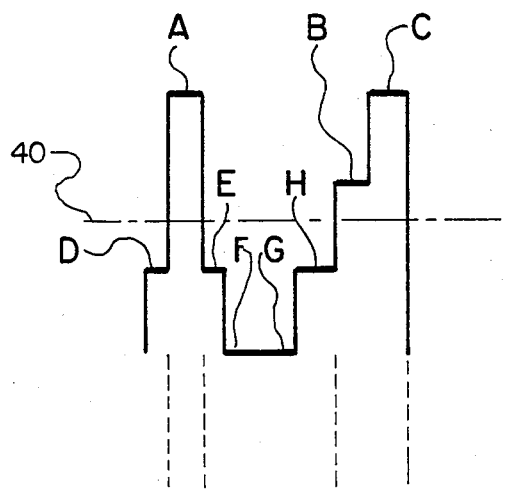
*Fig.2.a.*
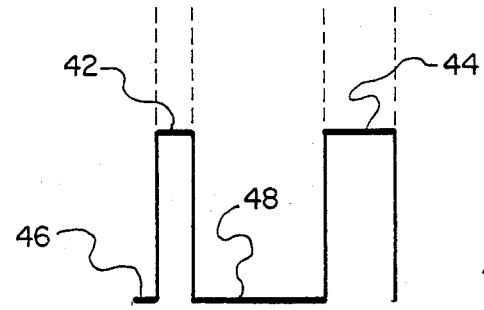
*Fig.2.b.*
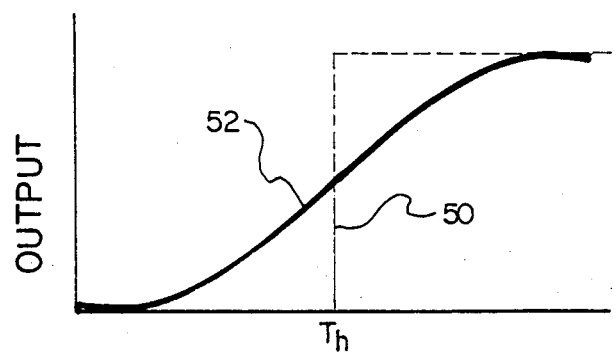
*Fig.3.*

APPARATUS AND METHOD FOR SPATIAL INTENSITY THRESHOLD DETECTION

BACKGROUND OF THE INVENTION

1. Field of the Invention

This invention relates to devices and methods used to detect the locations at which the intensity of an optical image exceeds a threshold level, and more particularly to phase conjugate resonators employed in optical data processing.

2. Description of the Prior Art

There are many signal processing applications which require the processing of electrical data at a very high rate. The use of optics for these applications is very appealing because of the massive parallelism that can be obtained, i.e., a large amount of information can be processed using a single beam. One application of particular interest is the processing and detection of electronic signals by electro-optic correlation techniques. In these and various other applications it is desirable to employ a binary or threshold type of detection scheme which is sensitive to the optical signal at many different locations in the beam. The object is to detect whether the beam's optical intensity at one or more locations exceeds or falls below a threshold level, rather than to determine the absolute magnitude of the beam intensity at such locations.

For example, one may detect the occurrence of a particular alpha-numeric character by optically correlating a candidate character or a field of characters with every possible character, either in sequence or in parallel. The desired character will produce the highest correlation peak in the output of an optical correlator. In searching over a field of multiple correlations, the identification of normalized intensity peaks greater than a specified value thus identifies the character.

The intensity of a correlation peak could be simply detected with an optical detector and fed into an electronic threshold detector whose activated output then identifies a detection event. Unfortunately, neither the expected position of the character nor its associated correlation peak is generally known. Accordingly, a very large number of optical detectors, perhaps numbering in the tens of thousands, might be required to cover the entire field of possible positions. Each of the detectors must have fast temporal responses, especially if the occurrence event is short-lived. Furthermore, all of the detectors must have individual threshold circuits, since in general each detector produces a spurious output. Such outputs occur even with "noise-free" detectors, since large numbers of detectors typically see strong cross-correlation peaks which, though individually falling well below threshold, may in their total output exceed the threshold level (assuming the detector outputs are accumulated by summing over blocks of the outputs). Thus, one conventional approach is to use a large number of individual threshold circuits, one per detector.

At present, the detection of processed images is done with a fast detector array, such as a fast television camera, and complicated electronics are used to average over a set number of frames and compare the intensity to a pre-set threshold value. The equipment required to accomplish this function is complex, expensive and space consuming.

SUMMARY OF THE INVENTION

The principal object of the present invention is the accomplishment of spatial threshold detection by purely optical means, requiring only a single detector to determine whether one or more spatially distributed optical threshold events have occurred.

Another object of the invention is the achievement of optical image processing to enhance the portions of an image having an intensity on one side of a given threshold, and to reduce or entirely eliminate all other image elements.

Another object is the provision of an effective memory device capable of retaining high resolution, spatially distributed optical information for relatively long periods of time.

A further object is the achievement of a very low noise optical threshold detector for a large number of spatially distributed optical signals.

These objects are accomplished by employing a phase conjugate resonator (PCR) to perform spatial optical threshold detection. The PCR includes a phase conjugate mirror (PCM), another mirror optically opposed to the PCM, and an oscillation cavity between the two, possibly containing an active gain medium. An optical beam having a spatial intensity pattern is applied to the PCM such that a high intensity spatial PCR oscillation output is produced at locations corresponding to the beam locations with optical intensities on one side of a threshold level, and a low intensity (ideally zero) output at the other locations. The PCR is required to have a greater than unity gain capability for appropriate threshold event conditions, while an output optical detector is positioned to sense and obtain threshold event information from the PCR output. The PCM has a reflectivity greater than unity, and/or a gain medium is added to the oscillation cavity to bring the PCR gain above unity. The output detector may be designed to sense either the spatially resolved optical output from the PCR, or the cumulative area output.

In one embodiment, the optical image is imposed on one or both pump beams of a degenerate four-wave mixing PCM. Two cross-coupled PCMs can also be used, with the image imposed upon both pump beams of one PCM, and the pump beams of the other PCM providing a reference. The information modulated pump beams interact with the PCM to produce a high intensity output at locations corresponding to the pump beam locations at which the optical intensities are above the threshold level, and a low intensity output at locations corresponding to the pump beam locations at which the optical intensities are below the threshold level. The detector has been found to be capable of retaining its output for appreciable periods of time even after its input has been removed, and thus can function as an effective memory device.

These and other features and advantages of the invention will be apparent to those skilled in the art from the following detailed description of preferred embodiments, taken together with the accompanying drawings, in which:

DESCRIPTION OF THE DRAWINGS

FIG. 1 is a block diagram of one embodiment of the invention, in which optical information is imposed on the pump beam of a PCM;

FIGS. 2a and 2b are illustrative diagrams showing an input optical intensity pattern for the embodiment of FIG. 1, and the resulting output pattern, respectively;

FIG. 3 is an idealized graph illustrating the system's output response to the modulated pump beam's optical intensity at any particular location in the beam.

DETAILED DESCRIPTION OF PREFERRED EMBODIMENTS

Figure 4:
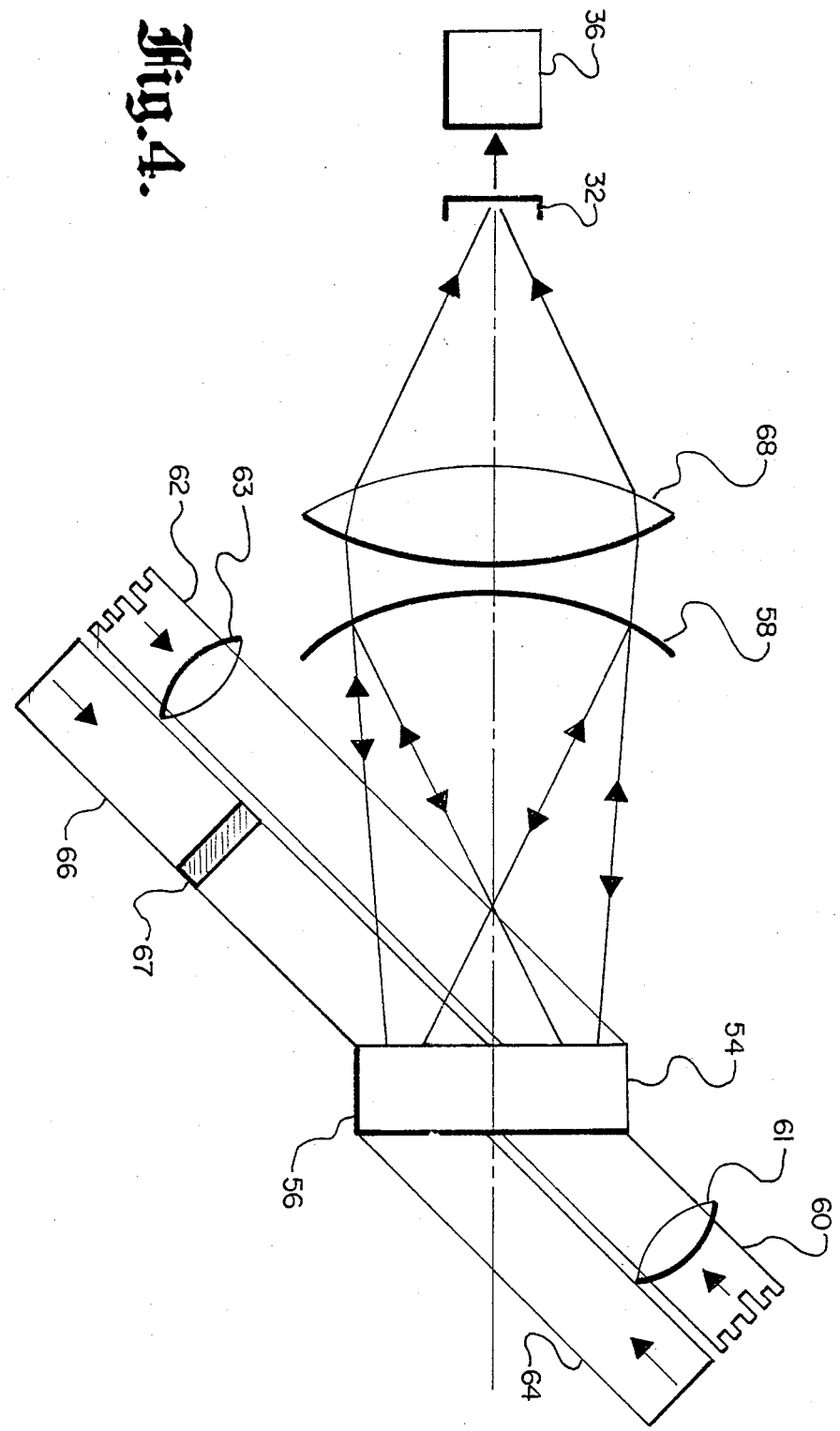
FIG. 4 is a block diagram of another embodiment in which a pair of cross-coupled PCMs are used.

This invention results from the recognition that a PCR, if properly constructed, is capable of retaining and transferring high resolution spatial information. PCRs were developed fairly recently, and have been found to have several characteristics which differ significantly from those of conventional resonators. For example, a PCR can compensate for intracavity distortions and thus extract energy effectively in situations where conventional resonators require an unstable resonator design, and with an "ideal" PCM will not have longitudinal modes that depend on cavity length. PCR technology and operating characteristics are discussed in a paper by C. R. Giuliano, R. C. Lind, T. R. O'Meara and G. C. Valley, "Can Phase Conjugate Resonators Enhance Laser Performance?", Laser Focus, February, 1983, pages 55–64; and also in a paper by A. E. Siegman, P. A. Belanger and A. Hardy, "Optical Resonators Using Phase Conjugate Mirrors", Optical Phase Conjugation, R. A. Fisher, Ed. (Academic Press, N.Y. 1983).

The threshold detector of the present invention makes use of unique properties which have been discovered for a PCR. Specifically, PCRs have been found to have a very high degree of spatial resolution. With a properly designed system, such as those illustrated herein, they can be used to produce output beams in which each location or pixel of the output beam has a direct relationship to the corresponding location in one or more of the beams applied to the PCR.

A block diagram of a first system which employs a PCR as part of a spatial intensity threshold detector is shown in FIG. 1. The PCR, indicated by dash lines 2, consists of a phase conjugate mirror (PCM) 4, an output coupler 30 in the form of a mirror which is positioned opposite the PCM, and an oscillation cavity 8 between the PCM and output coupler. The PCM is of the degenerate four-wave mixing type, in which a pair of counterpropagating pump laser beams 10 and 12 are applied in opposite directions to an optical mixing medium 14.

Basically, a PCM produces a retro-reflection of an incident probe beam, with the phase of the reflected beam reversed from that of the incident beam. During PCM operation the probe and pump beams interfere in the non-linear mixing medium, producing an interference pattern. This pattern diffracts the pump beams, producing a signal wave which is the phase conjugate of the probe beam. In a PCR, scattered light from the pump beams in the mixing medium 14 travels across the cavity to the output coupler 30, where it is reflected back to the PCM. At the PCM the reflected scattered light is conjugated, amplified and reflected back to the output coupler; in this manner oscillation builds up to eventually produce a resonating beam oscillation within the cavity.

The pump beams are derived from a laser 16 whose output is directed by mirror 18 onto a beam splitter 20, and from there to the PCM as a pair of counterpropagating beams via mirrors 22 and 24. Laser 16 produces a coherent optical beam, the term "optical" being taken in its broad sense to indicate any wavelength at which a laser is capable of operating, not just the visible spectrum.

In accordance with the invention, a two-dimensional intensity profile is imposed on one of the pump beams 10, with the other beam having a substantially uniform intensity profile. This may be accomplished by passing the beam through a variable density mask or spatial light modulator 26 controlled by a two-dimensional image source 28, and imaging the beam onto the PCM by lens 29. Alternately, the same spatial information may be imposed on both pump beams and both beams imaged onto the PCM.

To establish oscillation within the PCR, it is necessary that the PCR gain be greater than unity. This can be accomplished by either employing a PCM whose reflectivity is sufficiently greater than unity, and/or by adding a gain medium to the resonating cavity. The PCM conjugating medium 14 for the FIG. 1 embodiment is, with the current state of the art, preferably a photorefractive material, in which case the reflectivity is dependent upon the ratio of the pump beam intensities. Thus, the threshold level can be controlled by varying the intensity of one or the other of the two pump beams.

The beam intensity at each individual pixel location in the modulated pump beam 10 determines whether oscillation will be established within the PCR at that location. PCR oscillation at each pixel location is generally independent of the presence or absence of oscillation at adjacent locations. Thus, a spatial oscillation pattern is established within the PCR which directly corresponds to the intensity profile of the modulated pump beam 10. Oscillation will be established at each pixel location for which the intensity of pump beam 10 exceeds a threshold level, whereas there will be no oscillation for pixel locations at which the intensity of modulated pump beam 10 is less than the threshold level.

The PCR produces an output through output coupler 30 at each pixel location where oscillation has been established. The spatial output from output coupler 30 is used to image the plane of the PCM onto a readout detector 32 (by a lens 34), the readout detector in turn providing an output to an electronic threshold detector 36. Alternately, mirrors or beam splitters could be placed in the oscillation cavity at an angle to the oscillating beam paths to provide an output by deflecting a portion of the resonating waves out of the cavity. Electronic threshold detector 36 generates a binary signal indicating the presence or absence of an optical output at each pixel location. For example, readout detector 32 could be an optical display, and threshold detector 36 a raster scanning device that converts the display array pattern to a series of binary electrical signals which indicate the presence or absence of an optical signal at each display pixel. Alternately, the detection apparatus could consist simply of a gross optical detector that accumulates the total area optical output from the PCR to indicate whether the output taken as a whole has exceeded a given threshold.

FIG. 2a shows an illustrative optical intensity pattern that could be imposed on the pump beam 10 of FIG. 1; the horizontal axis corresponds to distance across the beam while the vertical axis corresponds to the optical intensity at each pixel location. In practice, a much higher density of discrete optical intensities could be handled, and the pattern would be two-dimensional.

Dashed horizontal line 40 indicates the threshold oscillation level established by the ratio between the intensities of the two pump beams, the construction of the PCM and the presence or absence of any gain medium or variable loss in the oscillation cavity. The optical intensity exceeds the threshold level at pixel locations A, B and C, and is less than the threshold level at the pixel locations D, E, F, G and H. As described above, optical oscillation is established for those pixel locations at which the threshold level is exceeded. The resulting output pattern is illustrated in FIG. 2b. High intensity positive outputs 42, 44 are produced at those pixel locations at which the optical intensity threshold level is exceeded, while low intensity essentially zero outputs 46, 48 result from the pixel locations at which the optical intensity is less than the threshold level.

FIG. 3 is a graphical illustration of the intracavity response at each pixel location to the modulated pump beam intensity. In the idealized case there will be no oscillation at all, and accordingly zero PCR output, for all pump beam intensities below the threshold level. At the threshold the response would rise along a vertical trace, indicated by dash line 50, to a uniform output level which prevails for higher intensities. In practice, the PCR response is somewhat more gradual, as indicated by curved line 52.

Instead of a simple mirror, output coupler 30 could be a liquid crystal light valve (LCLV) such as that disclosed in U.S. Pat. No. 3,824,002 to Terry D. Beard, entitled "Alternating Current Liquid Crystal Light Valve" and assigned to Hughes Aircraft Company, the assignee of the present invention. In that case the spatial intensity information would modulate an input beam applied to the control input to the LCLV from outside the PCR, rather than to the PCM pump beams. As most LCLVs rely upon polarization rotation, a polarizer would be located on the cavity side of the LCLV. The polarizer would be selected so that light reflected from the LCLV is rejected on the cavity side except at those locations where the LCLV is actuated by the modulated input beam. The threshold level could be set by various means, such as by applying a light bias to the LCLV and/or setting the polarizer angle.

Another embodiment of the invention is illustrated in FIG. 4. A "folded" resonator is shown which consists of two PCMs 54, 56 and a curved output coupler mirror 58 which images one PCM onto the other. The upper PCM 54 is pumped with a pair of pump beams 60, 62, each of which contains the spatially modulated intensity pattern and are imaged onto PCM 54 by lenses 61 and 63, respectively. The lower PCM 56 is pumped with spatially uniform pump beams 64, 66 whose total intensity may be adjusted to provide a variable oscillation threshold. A neutral density filter 67 may be placed in one of the beam paths 66 to control the threshold. When one or more of the modulated pump beam pixel locations exceeds the threshold intensity, a corresponding number of oscillating modes are established within the PCR, and an output is directed onto the readout detector 32 through a lens 68. The provision of two cross-coupled PCMs helps to reduce diffraction losses and cross-talk.

The PCM conjugating medium for either embodiment is preferably a photorefractive material, although other media such as saturable absorbers might also be used. For photorefractive materials with a sufficiently high electro-optic coefficient, such as barium titanate (BaTiO$_3$) or strontium barium niobate (Sr$_{1-x}$Ba$_x$Nb$_2$O$_6$), the PCM will have a reflectivity sufficiently larger than unity to establish oscillation within the PCR. Other photorefractive materials with lower electro-optic coefficients may also be used in conjunction with reflectivity enhancement techniques such as frequency shifting or the application of an AC electrical field. The frequency shift technique is disclosed in an article by H. Rajbenbach and J. P. Huignard, "Optics Letters", vol. 10, page 137, March, 1985; the AC electric field technique is disclosed in a co-pending application by George Valley and Marvin Klein, "Self-Pumped Phase Conjugate Mirror and Method Using AC Field Enhanced Photorefractive Effect", Ser. No. 836,679, filed Mar. 5, 1986 and assigned to Hughes Aircraft Company, the assignee of the present invention. Typical materials that can be used in connection with such enhancement techniques are Bi$_{12}$SiO$_{20}$, Bi$_{12}$GeO$_{20}$, Bi$_{12}$TiO$_{20}$, GaAs and InP. A gain medium may also be added to the oscillation cavity to bring the PCR gain above unity if the PCM reflectivity is less than unity. The gain medium can generally be any medium suitable for establishing lasing action, such as a HeNe discharge.

The described system also functions as an effective memory device. With a relatively slow PCR response time, the spatial output pattern will persist for a period of time even after the pump beams have been removed. The use of barium titanate as a conjugating medium will provide a memory period of several seconds. In this manner the device can also be used as an optical memory. A spatial light modulator such as a liquid crystal light valve could be used to control the pump beam intensity modulation. When its spatially modulated input is removed, a liquid crystal light valve will produce an output of uniform intensity for the pump beam modulation. On the other hand, a substantial shortening of the PCM conjugating medium's response time will produce a correspondingly faster PCR response time that could make the system adaptable for real time applications.

The invention lends itself to numerous optical data processing applications. It can be used to determine when the optical intensity of any single pixel or group of pixels exceeds a prescribed but controllable threshold over a field of 10,000 pixels or more. Some applications for this high resolution capability include the detection of a convolution or correlation output, enhancement of an input beam's signal-to-noise ratio, incoherent-to-coherent conversion and contrast or image reversal and enhancement.

As numerous modifications and alternate embodiments will occur to those skilled in the art, it is intended that the invention be limited only in terms of the appended claims.

We claim:

1. A spatial optical intensity threshold detector, comprising:
    a phase conjugate resonator (PCR) comprised of a phase conjugate mirror (PCM), a mirror means optically opposed to the PCM and an oscillation cavity between the PCM and mirror means, the PCR having a greater than unity gain,
    means for applying an optical input beam having a spatial intensity pattern to the PCR, the beam cooperating with the PCR to produce a high intensity spatial PCR oscillation output at locations corresponding to the beam having optical intensities on one side of a threshold intensity level, and an optical detector means positioned to sense the PCR oscillation pattern.

2. The optical intensity threshold detector of claim 1, wherein the PCM is a degenerate four-wave mixing device which includes means for forming a pair of counter-propagating pump beams, at least one of the pump beams comprising the optical input beam with the spatial intensity pattern.

3. The optical intensity threshold detector of claim 2, wherein the PCM has a photorefractive conjugating medium.

4. The optical threshold detector of claim 2, the PCM having a reflectivity greater than unity.

5. The optical threshold detector of claim 2, the PCM having a reflectivity less than unity, and further comprising a gain medium in the oscillation cavity to elevate the PCR gain above unity.

6. The optical intensity threshold detector of claim 1, wherein the detector means comprises means for detecting the spatial optical output from the PCR.

7. The optical intensity threshold detector of claim 1, wherein the detector means comprises means for sensing the cumulative area optical output from the PCR.

8. The optical threshold detector of claim 1, the mirror means comprising a liquid crystal light valve (LCLV), and the optical input beam being applied as a control beam to the LCLV from outside the PCR.

9. A method for detecting the spatial portions of an optical input beam which exceed a predetermined optical intensity threshold level, comprising:

directing the input beam onto a phase conjugate resonator (PCR) to excite a spatially distributed oscillation therein which corresponds with the portions of the beam having optical intensities on one side of the threshold level, and detecting the PCR oscillation pattern.

10. The method of claim 9, the PCR including a phase conjugate mirror (PCM), wherein the input beam is directed onto the PCM.

11. The method of claim 9, wherein the PCR oscillation pattern is detected by sensing its spatial optical output.

12. The method of claim 9, wherein the PCR oscillation pattern is detected by sensing its cumulative area optical output.

13. An optical intensity threshold detector for an optical input beam having a spatial intensity pattern, comprising:

a phase conjugate resonator (PCR) comprised of a degenerate four-wave mixing phase conjugate mirror (PCM), a mirror means optically opposed to the PCM and an oscillation cavity between the PCM and mirror means, the PCR having a greater than unity gain, means for generating and applying a pair of pump beams to the PCM, the pump beams having sufficient intensity to produce an oscillation optical output from the PCR, means for modulating at least one of the pump beams with a spatial intensity pattern, the pump beams cooperating with the PCR to produce a high intensity spatial PCR oscillation output at locations corresponding to the locations of the modulated pump beam having optical intensities above a threshold level, and a low intensity output at locations corresponding to the locations of the modulated pump beam having optical intensities below said threshold level, and an optical detector means positioned to sense the PCR oscillation pattern.

14. The optical intensity threshold detector of claim 13, wherein the PCM has a photorefractive conjugating medium.

15. The optical intensity threshold detector of claim 13, wherein the detector means comprises means for sensing the spatial optical output from the PCR.

16. The optical intensity threshold detector of claim 13, wherein the detector means comprises means for sensing the cumulative area optical output from the PCR.

17. The optical intensity threshold detector of claim 13, the pumped PCM having a reflectivity greater than unity.

18. The optical intensity threshold detector of claim 13, the pumped PCM having a reflectivity less than unity, and further comprising a gain medium in the oscillation cavity to elevate the PCR gain above unity.

19. The optical intensity threshold detector of claim 13, further comprising a second degenerate four-wave PCM within the PCR, the mirror means which is opposed to the first PCM serving to cross-couple the two PCMs, said modulating means being adapted to modulate both pump beams of the first PCM, and the second PCM's pump beams being substantially unmodulated to provide a threshold reference.

20. A method for detecting the spatial portions of an optical beam which exceed a predetermined optical intensity threshold level, comprising:

forming a pair of optical pump beams, modulating at least one of the pump beams with a spatial optical intensity profile to be compared to the threshold level, applying the pump beams to pump a phase conjugate mirror (PCM) which forms a portion of a phase conjugate resonator (PCR), and thereby inducing a spatial oscillation pattern within the PCR which corresponds to the locations within the modulated beams at which the optical intensity exceeds said predetermined threshold, and detecting the PCR oscillation pattern.

21. The method of claim 20, wherein the PCR oscillation pattern is detected by sensing its spatial optical output.

22. The method of claim 20, wherein the PCR oscillation pattern is detected by sensing its cumulative area optical output.

23. The method of claim 20, further comprising the steps of optically cross-coupling the PCM with a second PCM within the PCR, modulating both pump beams of the first PCM, and applying a pair of unmodulated pump beams to the second PCM to provide a threshold reference.

24. An optical intensity memory device for retaining spatial information on the locations of an optical beam having an optical intensity on one side of a threshold level, comprising:

a phase conjugate resonator (PCR) comprised of a phase conjugate mirror (PCM), a mirror means optically opposed to the PCM and an oscillation cavity between the PCM and mirror means, the PCR having a greater than unity gain, and a relatively slow response to optical beams applied to the PCM, means for applying an optical beam having a spatial intensity pattern to the PCM, the beam cooperating with the PCM after a response period to produce a high intensity spatial PCR oscillation output at locations corresponding to the locations of the beam having optical intensities on one side of a threshold level, and a low intensity output at locations corresponding to the beam having optical intensities on the other side of the threshold level, the PCR retaining said output for approximately the response period after removal of the optical beam, and an optical detector means positioned to sense the PCR oscillation pattern.

25. The optical intensity memory device of claim 24, the PCM comprising a degenerate four-wave mixing device which includes means for forming a pair of counter-propagating pump beams, said optical beam being applied as a modulation of at least one of the pump beams such that the PCR produces a high intensity spatial oscillation output at locations corresponding to the locations of the modulated pump beam having optical intensities above the threshold level, and a low intensity output at locations corresponding to the locations of the modulated pump beam having optical intensities below the threshold level.

* * * * *